United States Patent
Bitou et al.

(10) Patent No.: US 10,484,538 B2
(45) Date of Patent: Nov. 19, 2019

(54) COMPUTER-IMPLEMENTED METHOD OF FOWARDING CALLS PREDICTIVE DIALER SYSTEM AND DATA BASE

(71) Applicant: Unify Patente GmbH & Co. KG, Munich (DE)

(72) Inventors: Antigoni Bitou, Attiki (GR); Stamatios Glikos, Athens (GR); Ilianna Spiliopoulou, Athens (GR); Nikolaos Skintzis, Athens (GR); Aristeidis Giachalis, Athens (GR); Anthansios Pagonis, Vrilissia (GR); Alexandros Cheimarios, Glika Nera (GR)

(73) Assignee: InContact Inc., Salt Lake City, UT (US)

( * ) Notice: Subject to any disclaimer, the term of this patent is extended or adjusted under 35 U.S.C. 154(b) by 0 days.

(21) Appl. No.: 16/104,996

(22) Filed: Aug. 20, 2018

(65) Prior Publication Data
US 2019/0058791 A1    Feb. 21, 2019

(30) Foreign Application Priority Data
Aug. 21, 2017   (EP) .................................. 17187102

(51) Int. Cl.
| | |
|---|---|
| H04M 3/51 | (2006.01) |
| G10L 15/22 | (2006.01) |
| G10L 15/18 | (2013.01) |
| H04M 3/523 | (2006.01) |
| G10L 15/08 | (2006.01) |

(52) U.S. Cl.
CPC ....... *H04M 3/5158* (2013.01); *G10L 15/1815* (2013.01); *G10L 15/22* (2013.01); *H04M 3/5175* (2013.01); *H04M 3/5238* (2013.01); *G10L 15/08* (2013.01); *H04M 2201/40* (2013.01)

(58) Field of Classification Search
None
See application file for complete search history.

(56) References Cited

U.S. PATENT DOCUMENTS

| | | | |
|---|---|---|---|
| 5,327,490 A | 7/1994 | Cave | |
| 6,804,346 B1 * | 10/2004 | Mewhinney | H04M 3/5158 379/265.1 |

(Continued)

FOREIGN PATENT DOCUMENTS

| | | |
|---|---|---|
| IE | S66411 B2 | 12/1995 |
| KR | 20120025490 A | 3/2012 |

*Primary Examiner* — Antim G Shah
(74) *Attorney, Agent, or Firm* — Pearl Cohen Zedek Latzer Baratz LLP

(57) ABSTRACT

An improved predictive dialer system and method that dials telephone numbers and connects answered calls to available agents monitors an active call between an agent and a client using speech recognition. In the active call, the speech recognition searches for occurrence of at least one key phrase that indicates intention of termination of the call; and upon occurrence of at least one key phrase, predicts a remaining time period until the call will be terminated. Based on the predicted remaining time period, during the remaining time period, the system or method determines a point of time for initiating at least one new call to a client and initiates at least one new call at the determined point of time.

20 Claims, 3 Drawing Sheets

(56) References Cited

U.S. PATENT DOCUMENTS

| | | | | |
|---|---|---|---|---|
| 8,699,699 B1* | 4/2014 | Anisimov | ............ | H04M 3/5158 |
| | | | | 379/265.01 |
| 2005/0069119 A1* | 3/2005 | Erhart | ..................... | H04M 3/51 |
| | | | | 379/215.01 |
| 2015/0215464 A1* | 7/2015 | Shaffer | ............... | H04M 3/5238 |
| | | | | 379/266.06 |

* cited by examiner

COMPUTER-IMPLEMENTED METHOD OF FOWARDING CALLS PREDICTIVE DIALER SYSTEM AND DATA BASE

CROSS-REFERENCE TO RELATED APPLICATIONS

The present application claims priority to European Patent Application No. 17187102.3 which was filed on Aug. 21, 2017. The entirety of this European patent application is incorporated by reference herein.

FIELD OF INVENTION

The present invention relates to a computer-implemented method of forwarding calls using a predictive dialer system, a predictive dialer system for carrying out the method, and a data base.

BACKGROUND OF THE INVENTION

A predictive dialer system basically is a system that dials telephone numbers and connects answered calls to available agents. Predictive dialer systems may be used for various purposes. For example, such a system may be used in call centers in out-call scenarios where telephone agents talk to clients on the phone, and the predictive dialer in operation, dials a list of telephone numbers and, as soon as a dialed telephone number is answered, the system connects the call to the next available agent.

In order to minimize the time agents spend waiting for a next call to be answered by a client, statistical algorithms are used by the predictive dialer systems.

However, predictive dialer systems known in prior art are facing the following problem. On the one hand, a significant amount of telephone numbers have to be dialed so that in the end, at least some of the telephone numbers dialed are answered and may be forwarded to an available agent so as to keep the agent busy without substantial waiting time between calls. On the other hand, dialing multiple telephone numbers at a time might result in a certain number of calls being answered with no agent being available for these calls to be forwarded, since the telephone numbers are already dialed when the agent or agents are still busy talking to another client.

The above problem arises from the fact that current predictive dialer systems use statistics of previous calls on call completion rate, ringing time, and call duration time to determine when the next telephone number has to be dialed, or to determine how many numbers have to be dialed until at least one telephone number dialed is answered by a client. However, the status and progress of active calls is not taken into consideration.

Therefore, with the use of predictive dialer systems known in prior art, a certain percentage of calls are missed for the reason mentioned above, thus, resulting in market losses.

SUMMARY OF THE INVENTION

Therefore, an object on which the present invention is based is to provide a computer-implemented method of forwarding calls and a predictive dialer system as well as a data base, according to which the above mentioned problem is solved. In particular, the present invention is based on the objective of reducing wait time of an agent and at the same time to also reduce the percentage of missed calls.

This problem is solved by a computer-implemented method of forwarding calls having the features, a predictive dialer system and a data base having the features disclosed and claimed. Preferred embodiments of the invention are defined in the respective dependent claims.

Accordingly, a computer-implemented method of forwarding calls is provided, comprising the steps of monitoring an active call between an agent and a client using speech recognition, wherein, in the active call, the speech recognition searches for occurrence of at least one key phrase that indicates intention of termination of the call; upon occurrence of at least one key phrase, predicting a remaining time period until the call will be terminated; based on the predicted remaining time period, during the remaining time period, determining a point of time for initiating at least one new call to a client for being handled by the agent; and initiating at least one new call at the determined point of time.

According to the inventive method, higher call completion rates and substantially reduced agent waiting time are achieved, resulting a more efficient call center operation, in particular, in out-call scenarios.

According to a preferred embodiment of the method, predicting is performed on the basis of statistical data with respect to time periods acquired by monitoring previous calls.

Further, monitoring previous calls may comprise searching and extracting key phrases from the previous calls that indicate intention of the termination of the call, using speech recognition.

According to another preferred embodiment, the method comprises a step of mapping, in a data base, each extracted key phrase to a respective average time period until the call will be terminated upon occurrence of the key phrase.

Moreover, initiating at least one new call may comprise dialing a predetermined number of telephone numbers, in particular, three, four, five, or six telephone numbers.

According to still another preferred embodiment, the first one of the predetermined number of telephone numbers which is answered by a client is forwarded to the agent.

The monitoring previous calls may further comprise determining the number of answered calls per all calls dialed within a predetermined time period.

It is also advantageous, if monitoring previous calls further comprises determining the average time until a call is answered by a client.

Preferably, the speech recognition for searching the at least one key phrase in the active call uses a search algorithm which corresponds to the search algorithm used in the step of searching and extracting phrases from the previous calls that indicate the termination of calls.

Moreover, according to the present invention, a predictive dialer system is provided which is adapted for carrying out a method of forwarding calls as outlined above. The predictive dialer system may either be implemented as hardware, for example as standalone hardware device, or it may be implemented in software, for example, with a call center platform or the like.

Also, according to the invention, a data base is provided comprising statistical data which has been acquired according to the method as outlined above.

Thus, according to the inventive method and predictive dialer system, recordings of previous calls—which usually are made for security and training reasons—are used to extract and identify key phases that indicate that the call will terminate soon. These identified key phrases are used during a call with speech recognition to identify the optimal pointin-time for the predictive dialer to initiate succeeding calls so as to minimize the agent's waiting or idle time. By using statistics of previous calls, such as the clients' average time to answer and the percentage of calls that are actually answered in combination with the extraction and identification of key phrases indicating the termination of a conversation, thereby taking the actual status of an active call into account, there will be a very small chance of losing a client due to agent unavailability.

Further, based on the expected remaining call duration, a formula can be applied leveraging on existing statistics considering a call completion rate for the number of subsequent call attempts and average ringing time.

Speech recognition techniques are advantageously employed in order to determine the status of active calls and whether they are close to being terminated. Consequently, no agent and/or supervisor effort is required. Existing techniques are enhanced by the present invention which provides a better estimation of the optimal time to start dialing new calls, taking into account each call separately as well as its current status, and not just average values.

Further aspects, embodiments, objects and advantages of the present invention will become apparent by the following description of exemplary embodiments with reference to the accompanying drawings, wherein:

Figure 1:
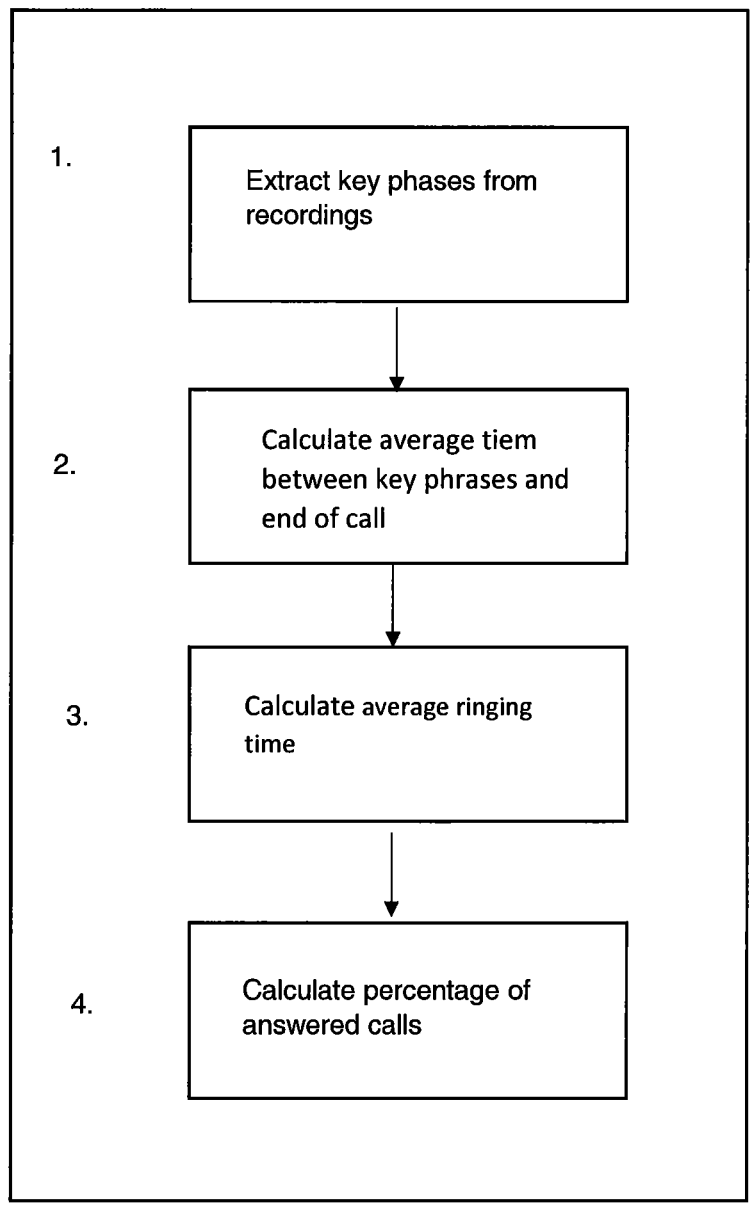
FIG. 1 is a flow chart diagram illustrating the method steps according to an embodiment of the invention in a learning stage.

A key for the reference numbers used in the drawings is also provided below:
1 predictive dialer system
2 data base
3 dialer component
4, 4' agent
5 monitoring component
6 central processing component

DESCRIPTION OF THE PREFERRED EMBODIMENTS

FIG. 1 shows a flow chart of the method steps according to an embodiment of the invention. These steps reflect a learning stage or the step of monitoring previous calls.

Basically, the method of forwarding calls may be applied in call-centers and in particular, in out-call scenarios according to which a predictive dialer system places a number of calls, wherein as soon as a call is answered by a client, it is forwarded to an agent. The method is a two-stage process: in a first stage, statistical data is collected from previous calls, which in a second stage is used for placing calls to be connected to an agent of a call center.

Basically, in the method of forwarding calls, existing sets of recordings and algorithms, for example, from previous calls which have been recorded, for example, for learning or security purposes are utilized to extract key phrases that are heard in these recordings, and which indicate that the call will be terminated soon (step 1). Then, for each key phrase, the average time between the moment of occurrence of the respective key phrase and the time point of actually ending the call is determined (step 2).

Then, a mapping is created between the moment this key phrase and the average time between the moment this key phrase is heard and the end of the call. Such a mapping is done for every key phrase. That means each key phrase is associated with an average time until end of the call, once the key phrase occurs in a call. Also from existing recordings, the percentage of answered calls as well as the average ringing time of the clients' phones is extracted. The key phrases thus obtained along with the their mapped (i.e., associated) respective average time up to the end of the call as determined above are stored in a data base ("key phrases of intention to end the call").

To give an example, such a key phrase may be "thank you, I am not interested", and the call in which that phrase occurs, will be hung up typically 6 seconds later. Thus, in the data base, this key phrase is stored, along with the 6 seconds as the average time until the call is ended.

Furthermore, the data base may also store and provide information as to the average time needed for establishing a new call. It may be called an average ringing time. This time is also calculated on the basis of calls (step 3), and may depend on the communications network used as well as on the day time of the call, the subscriber number dialed, e.g., the length of the numbers, local prefix, country code.

Finally, the data base store and provides statistics on the percentage of answered calls with respect to the total number of calls. The statistics will be taken into account when initiating new calls. If the statistics say that only one out of three calls is actually answered, the calling system will initiate three new calls rather than only one.

This data base is used during active calls for predicting the time until an active call is ended, in order to initiate one or more new calls already during the still running call. So, this one or more new calls will be established (i.e., on the point to be answered by the called person) right at the (predicted) end of the currently active call, so that the calling agent as well as the dialing system will better exploit their time.

Figure 2:
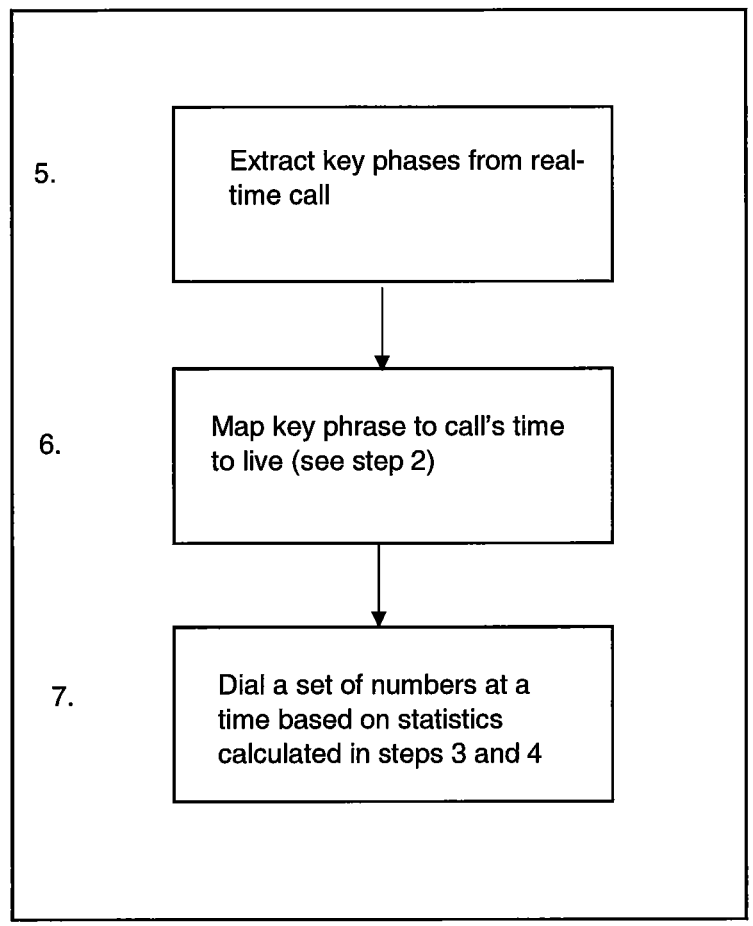
FIG. 2 is a further flow chart illustrating the method steps according to an embodiment of the invention in real-time operation.

With reference to FIG. 2, in more detail, in the second stage, in real-time calls, basically the same algorithms as mentioned above are used to extract the key phrases. This means, an active call between an agent and a client is monitored, using speech recognition, wherein, by applying speech recognition, it is searched for occurrence of at least one key phrase that indicates intention of termination of the call (step 5). The key phrases searched for are those which are comprised in the data base described above.

Thus, during the active call, upon occurrence (and extraction) of at least one key phrase which predicts a remaining time period until the call will be terminated, the method determines, based on the predicted remaining time period until the call will be ended, a point of time for initiating at least one new call to a client for being handled by the agent (step 6). In this way, the method takes into account the time needed for establishing a new call, i.e., the time for dialing a new number plus the time until the call is usually answered. If the remaining time period until the call is ended is determined to be 6 seconds, and the time for dialing a new number is 4 seconds, the point in time for initiating one or several new calls is determined to be 2 seconds after occurrence of the key phrase in the active call.

At the point of time thus determined, the at least one new call is initiated (step 7).

Instantly, the mapping created in the previous stage is searched in order to match the key phrases and to provide an estimation of the remaining time of a call. After calculating this value, the time period until a call is answered by a client is taken into account, and a predictive dialer will start dialing a predetermined number of telephone numbers during the active call of an agent.

Also, if for instance it has been determined that only one out of three initiated calls will be answered, then the predictive dialer will simultaneously call three telephone numbers so as to have a higher chance of successful call completion.

The actual time between occurrence of a key phrase and ending the call may be taken into account for updating the data base as described above. Thus, the present invention provides a self-learning predictive dialing system. Further, the actual time for establishing a new call may also be continuously determined in order to find the right point in time for initiating new calls.

Figure 3:
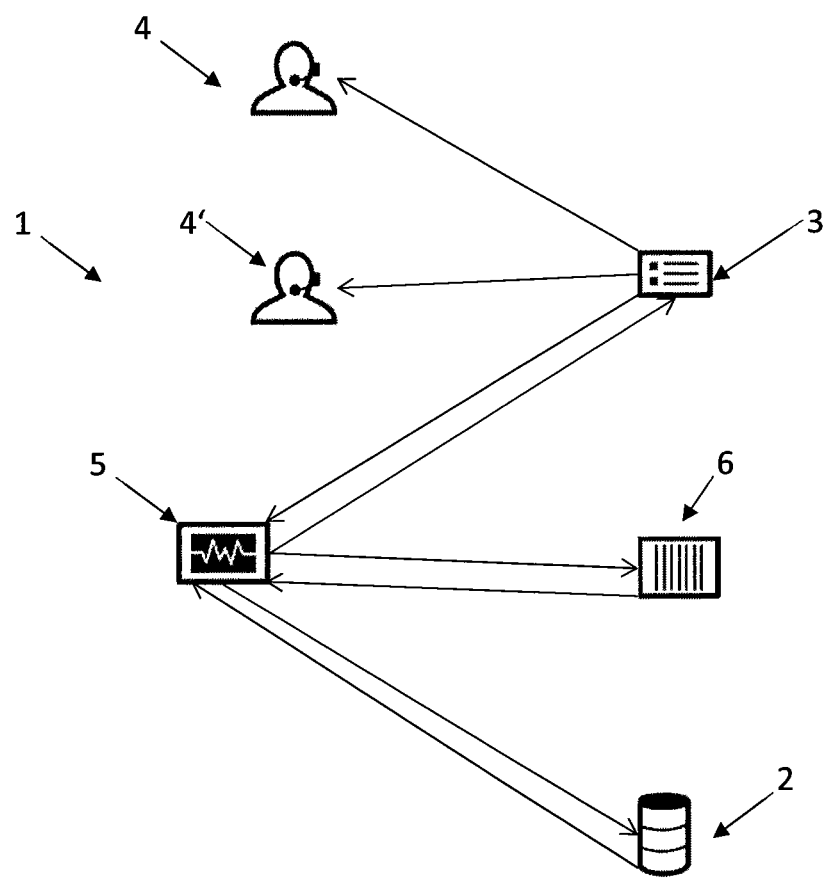
FIG. 3 is a diagram that illustrates a call center scenario implementing a predictive dialer system.

The present invention further comprises a predictive dialer system 1 which implements the methods as described before. FIG. 3 illustrates components of this system.

The system 1 comprises a data base 2 which holds the key phrases along with their respective average times until ending the calls upon occurrence of the key phrases in active calls. The data base 2 allows access to the key phrases and to the respective average times. Data bases and access systems to data bases are known in the art; thus the techniques thereof are not described herein in more detail.

In one embodiment of the invention, the data base 2 is not static. This means that it may be updated with further key phrases and/or other average times until end of the call which may have been derived from calls where the data base is actually used to monitor the calls according to the second stage of the method as described above. Thus, a self-learning data base 2 or system is provided. Furthermore, the data base 2 may also be continuously updated as to the time needed for establishing a new call.

Moreover, the system 1 comprises a dialer component 3 which initiates (i.e., dials up) the calls and forwards the initiated calls, once they are responded ("active calls"), to agents 4, 4'.

Further, the system 1 comprises a monitoring component 5 which monitors the active call for occurrence of the key phrases. This component has with speech recognition capabilities, i.e., is able to identify key phrases in the calls. Speech recognition capabilities are known in the art; therefore they will not be described in further detail here.

The system 1 further comprises a central processing component 6 which controls or co-ordinates the components described before. In more detail this processing component 6 co-ordinates initiating the calls, monitoring the active calls, accessing the data base 2, determining the time points for initiating new calls, initiating new calls, as well as updating the data base 2 with new data on ley phrases and average times until end of the calls.

It is to be noted, that these components may be embodied in in one single computer system, or in several different computer systems, be they at one place or at different places, linked by one or more communication networks such as the Internet.

What is claimed is:

1. A computer-implemented method of forwarding calls in a predictive dialer system that dials telephone numbers and connects answered calls to available agents, the method comprising the steps of:

a processing component of the predictive dialer system monitoring a first active call between an agent and a client using speech recognition to detect, during the first active call, an occurrence of at least one key phrase audibly spoken during the first active call that indicates intention of termination of the first active call;

the processing component of the predictive dialer system monitoring a call completion rate for call attempts and an average ringing time for the call attempts;

in response to detection of a key phrase of the at least one key phrase, predicting a remaining time period until the first active call will be terminated based on an average time value associated with the key phrase that was detected, the average time value being stored in a database that maps the average time value with the key phrase that was detected, the database being stored in a non-transitory computer readable medium that is communicatively accessible to the processing component of the predictive dialer system;

the processing component of the predictive dialer system selecting a number of new second call attempts based on the monitored call completion rate during the first active call;

the processing component of the predictive dialer system determining a point of time for initiating the selected number of new second call attempts for establishment of a new second call between the agent and a new client for being handled by the agent based on the predicted remaining time period until the first active call will be terminated, the monitored average ringing time for call attempts, and an amount of time needed for dialing to initiate the selected number of new second call attempts; and the predictive dialer system initiating the selected number of new second call attempts to establish the new second call between the agent and the new client at the determined point of time during the first active call and before termination of the first active call.

2. The method according to claim 1, wherein the average time value associated with the key phrase stored in the database is based on statistical data with respect to time periods acquired by monitoring previous calls, and the detected key phrase is a key phrase spoken by the client during the first active call.

3. The method according to claim 2, comprising: the monitoring of the previous calls, wherein the monitoring of the previous calls comprises searching and extracting key phrases from the previous calls that indicate intention of call termination using speech recognition.

4. The method according to claim 3, further comprising mapping, each extracted key phrase to a respective average time period until call termination will occur in the database such that the database stores information indicating a plurality of average time periods for different key phrases, each average time period being a value determined from data obtained from the monitoring of the previous calls.

5. The method according to claim 1 wherein the predictive dialer system initiating the selected number of new second call attempts comprises dialing a plurality of different telephone numbers for the new second call attempts.

6. The method according to claim 5, comprising:
forwarding the new second call to the agent such that a first of the new second call attempts that is answered by the new client is forwarded to the agent.

7. The method according to claim 2, wherein the monitoring of the call completion rate for call attempts comprises determining a number of answered calls per all calls dialed within a predetermined time period.

8. The method according to claim 2, comprising: determining an average time until a call is answered by a client based on the monitoring of the previous calls.

9. The method according to claim 2, wherein the speech recognition is configured for searching the at least one key phrase in the first active via a search algorithm which corresponds to a search algorithm used to search for and extract key phrases from the previous calls that indicate call termination.

10. A non-transitory computer readable medium having code stored thereon, the code defining a method that is performed by a predictive dialer system that runs the code via a processing component of the predicative dialer system, the method comprising:
monitoring a first active call between an agent and a client using speech recognition to detect, during the first active call, an occurrence of at least one key phrase audibly spoken by the client during the first active call that indicates intention of termination of the first active call;
monitoring a call completion rate for call attempts and an average ringing time for the call attempts;
in response to detection of a key phrase of the at least one key phrase audibly spoken by the client during the first active call, predicting a remaining time period until the first active call will be terminated based on an average time value associated with the key phrase that was detected, the average time value being stored in a database that maps the average time value with the key phrase that was detected, the database being stored in the non-transitory computer readable medium that is communicatively accessible to the processing component of the predictive dialer system;
selecting a number of new second call attempts based on the monitored call completion rate;
determining a point of time for initiating the selected number of new second call attempts for establishment of a new second call between the agent and a new client for being handled by the agent based on the predicted remaining time period until the first active call will be terminated, the monitored average ringing time for call attempts, and an amount of time needed for dialing to initiate the selected number of new second call attempts; and
initiating the selected number of new second call attempts to establish the new second call between the agent and the new client at the determined point of time during the first active call and before termination of the first active call.

11. The non-transitory computer readable medium of claim 10, wherein the average time value associated with the key phrase is based on statistical data with respect to time periods acquired by the processing component monitoring previous calls.

12. The non-transitory computer readable medium of claim 11, the method also comprising: the monitoring of the previous calls, wherein the monitoring of the previous calls comprises searching and extracting key phrases from the previous calls that indicate intention of call termination using speech recognition.

13. The non-transitory computer readable medium of claim 12, the method further comprising mapping each extracted key phrase to a respective average time period until call termination will occur in the database such that the database stores information indicating a plurality of average time periods for different key phrases, each average time period being a value determined from data obtained from the monitoring of the previous calls.

14. The non-transitory computer readable medium of claim 10, wherein the initiating of the selected number of new second call attempts comprises dialing a plurality of different telephone numbers for the new second call attempts.

15. The non-transitory computer readable medium of claim 14, wherein the method also comprises:
forwarding the new second call to the agent such that a first of the new second call attempts that is answered by the new client is forwarded to the agent.

16. The non-transitory computer readable medium of claim 11, the method comprising: determining an average time until a call is answered based on the monitoring of the previous calls.

17. The non-transitory computer readable medium of claim 11, wherein the speech recognition is configured for searching the at least one key phrase in the first active via a search algorithm which corresponds to a search algorithm used to search for and extract key phrases from the previous calls that indicate call termination.

18. A predictive dialer system comprising:
a processing component,
a non-transitory computer readable medium, a database being stored in the non-transitory computer readable medium,
a dialer component;
the processing component communicatively connectable to the non-transitory computer readable medium and the dialer component to control the dialer component;
the processing component configured to control monitoring of a first active call between an agent and a client using speech recognition to detect, during the first active call, an occurrence of at least one key phrase audibly spoken during the first active call that indicates intention of termination of the first active call;
the processing component configured to control monitoring a call completion rate for call attempts and an average ringing time for the call attempts;
the processing component configured to predict a remaining time period until the first active call will be terminated based on an average time value associated with a key phrase of the at least one key phrase that was detected in response to detection of the key phrase of the at least one key phrase audibly spoken during the first active call, the average time value being stored in the database for mapping the average time value with the key phrase of the at least one key phrase that was detected;
the processing component configured to select a number of new second call attempts during the first active call based on the monitored call completion rate;
the processing component configured to determine a point of time for initiating the selected number of new second call attempts for establishment of a new second call between the agent and a new client for being handled by the agent based on (i) the predicted remaining time period until the first active call will be terminated, (ii) the average ringing time for call attempts that is monitored and (iii) an amount of time needed for dialing to initiate the selected number of new second call attempts; and
the processing component configured to control the dialer component to initiate the selected number of new second call attempts to establish the new second call between the agent and the new client at the determined point of time during the first active call and before termination of the first active call.

19. The predictive dialer system of claim 18, wherein the average time value associated with the key phrase that was detected is based on statistical data with respect to time periods acquired by monitoring previous calls; and wherein the predicative dialer system is configured to map each extracted key phrase to a respective average time period until call termination will occur in the database such that the database stores information indicating a plurality of average time periods for different key phrases, each average time period being a value determined from data obtained from the monitoring of the previous calls.

20. The predictive dialer system of claim 18, wherein the dialer component is configured to dial a plurality of different telephone numbers for the selected number of new second call attempts to initiate the selected number of new second call attempts at the determined point of time during the first active call and before termination of the first active call; and wherein the at least one key phrase audibly spoken during the first active call that indicates intention of termination of the first active call is at least one key phrase spoken by the client during the first active call.

* * * * *